Patented July 27, 1937

2,088,140

UNITED STATES PATENT OFFICE 2,088,140

METAL PRIMER

Leo Rosenthal, Leverkusen-Wiesdorf, Wilhelm Becker, Cologne-Mulheim, and Reinhard Hebermehl, Cologne-Deutz, Germany, assignors to I. G. Farbenindustrie Aktiengesellschaft, Frankfort-on-the-Main, Germany No Drawing. Application June 12, 1934, Serial No. 730,362. In Germany July 1, 1933

6 Claims. (Cl. 91—68)

The present invention relates to metal-primers.

We have found that metal-primers, which are characterized by their content of chlorinated caoutchouc, unsaponifiable softening agents and pigments or fillers of a specific gravity of more than 5, show several advantages over the hitherto known metal-primers, chief among which are the high adhesive power, a good antirust effect, a high impermeability to water and the capability of securing excellent adhesion of the covering varnish applied thereon. We are aware of the fact that mixtures of chlorinated caoutchouc with drying oils or saponifiable softening agents and pigments of a high specific gravity have been employed as metal-primers before our present invention; however, we wish to point out that our new metal-primers show a considerably improved fastness to water. This is of particular advantage since the hitherto employed metal-primers are liable to form blisters when exposed to moist atmosphere, and are in consequence thereof unsuitable for the preparation of submarine coatings.

As unsaponifiable softening agents there may be mentioned, for instance, chlorinated naphthalenes, chlorinated diphenyls, alkylated or aralkylated naphthalenes, cumarone resins, high molecular sulfur-containing compounds, which are obtainable by causing sulfur to react upon homologues of benzene in the presence of small amounts of aluminium chloride (see U. S. Patents 1,426,430 and 1,427,182), or mixtures of paraffine oils or mineral oils with the before mentioned softening agents; however, we wish it to be understood, that the present invention is not restricted to these agents, other softening agents, provided that they are not volatile at ordinary or slightly elevated temperature and are compatible with the chlorinated caoutchouc and the pigment, being likewise suitable for the purposes in question.

It is one object of the present invention that the pigments or filling agents to be employed must have a specific gravity of at least 5, as pigments of a lower specific gravity impair the adhesive power of our metal-primers. Various pigments or filling agents of the character described may be employed and as examples there may be mentioned lead sulfide, lead chromate, white lead, red lead, micaceous iron ore, zinc dust, finely ground chrome iron ore, chromic oxide, ferrosoferric oxide, other pigments being likewise operative in our present invention provided that they show a specific gravity of at least 5 and are compatible with chlorinated rubber and the softening agents employed.

The amount of the pigments or filling agents employed can be varied within wide limits, it being preferable, however, to employ the same at least in an amount of about 100 per cent. calculated on the amount of the chlorinated caoutchouc. The amount of the unsaponifiable softening agent may likewise be varied within wide limits, depending on the intended application of the metal to be primed. Generally they are employed in an amount between about 5 and 100 per cent calculated on the amount of the chlorinated rubber employed in the primer.

As a matter of fact, instead of the single softening agent or single pigment there may be used mixtures thereof provided that they are compatible with each other and the other ingredients of the primer and that the pigments have a specific gravity of at least 5.

The above described compositions of matter serve as metal-primers and we wish to point out that covering varnishes applied thereon such as pigmented or non-pigmented oil lacquers, nitrocellulose lacquers or cellulose ether lacquers and lacquers which contain chlorinated caoutchouc firmly fix to the priming. The choice of the covering varnish depends on the application intended.

The primers may be applied upon the surface of the metal to be protected, for instance by spraying, dipping or brushing.

The following examples will illustrate the invention, without, however, limiting it thereto, the parts being by weight:—

Example 1

An iron container for benzine, which has been carefully freed from rust, is provided on the inside as well as on the outside with a primer, having the following composition:—

| | Parts |
|---|---|
| Chlorinated caoutchouc of a chlorine content of 65 per cent | 20 |
| Benzyl naphthalene | 2 |
| Chlorinated diphenyl (of a chlorine content of 57 per cent.) | 3 |
| White lead | 12 |
| Micaceous iron ore | 10 |
| Solvent | 52 |
| Chlorinated naphthalene of a chlorine content of 50 per cent | 1 |

Upon thoroughly drying of the prime layer the outside of the container is painted twice with a covering varnish consisting of standoil pigmented with titanium dioxide; the inside of the container is provided with a colorless benzylcellulose or chlorinated rubber-varnish.

Example 2

A steel container is provided with a primer consisting of:

| | Parts |
|---|---|
| Chlorinated caoutchouc of a chlorine content of 63 per cent | 25 |
| A high molecular sulfur-containing compound obtainable according to Example 1 of U. S. P. 1,426,430 | 10 |
| Red lead | 50 |

Upon this primer there is applied twice a varnish consisting of

| | Parts |
|---|---|
| Chlorinated caoutchouc of a chlorine content of 63 per cent | 25 |
| A high molecular sulfur-containing compound obtainable according to Example 2 of U. S. P. 1,426,430 | 10 |
| Cumarone resin | 2 |
| Titanium dioxide | 18 |

The covering layer obtained thereby shows an excellent fastness to acid vapours.

Example 3

An iron bridge is provided with a primer consisting of:—

| | Parts |
|---|---|
| Chlorinated caoutchouc of a chlorine content of 64 per cent | 25 |
| Paraffine oil | 2 |
| Xylylnaphthalene | 4 |
| A high molecular sulfur-containing compound obtainable according to Example 1 of U. S. P. 1,426,430 | 2 |
| Micaceous iron ore | 37 |

The covering layers applied thereon may contain a mixture of white lead and chromic hydroxide as pigments and a combination of nitrocellulose and of a linoleic acid-phthalic acid-glycerine condensation product.

The following claims refer to the use of pigments it being understood that this term is intended to comprise likewise filling agents.

We claim:—

1. A metallic article having a primer coating containing chlorinated rubber, an unsaponifiable difficulty volatile softening agent therefor and pigments having a specific gravity of at least 5 in an amount of at least about 100% calculated on the amount of chlorinated rubber and a top varnish coating containing a smaller proportion of pigment than the primer, said primer coating being substantially free of saponifiable softening agents.

2. A metallic article having a primer coating containing chlorinated rubber, an unsaponifiable difficultly volatile softening agent therefor in an amount of about 5 to about 100% calculated on the amount of chlorinated rubber and pigments having a specific gravity of at least 5 in an amount of at least 100% calculated on the amount of chlorinated rubber and a top varnish coating containing a smaller proportion of pigment than the primer, said primer coating being substantially free of saponifiable softening agents.

3. A metallic article having a primer coating according to claim 1, said primer coating containing chlorinated naphthalenes as unsaponifiable difficulty volatile softening agents.

4. A metallic article having a primer coating according to claim 2, said primer coating containing chlorinated naphthalenes as unsaponifiable difficultly volatile softening agents.

5. A metallic article having a primer coating according to claim 1, said primer coating containing as unsaponifiable difficultly volatile softening agents high molecular sulfur compounds obtainable by causing sulfur to react upon homologues of benzene in the presence of small amounts of aluminium chloride.

6. An iron article having a primer coating containing chlorinated rubber of a chlorine content of 65%, chlorinated naphthalene of a chlorine content of 50% in an amount of about 5% calculated on the amount of chlorinated rubber, and white lead and micaceous iron ore as pigments in an amount of about 110% calculated on the amount of chlorinated rubber but containing substantially no saponifiable softening agents, and furthermore, having a top varnish coating containing less than 110% of titanium dioxide as a pigment.

LEO ROSENTHAL.
WILHELM BECKER.
REINHARD HEBERMEHL.